(12) United States Patent
Pickard et al.

(10) Patent No.: US 9,345,091 B2
(45) Date of Patent: May 17, 2016

(54) LIGHT EMITTING DEVICE (LED) LIGHT FIXTURE CONTROL SYSTEMS AND RELATED METHODS

(71) Applicant: CREE, Inc., Durham, NC (US)

(72) Inventors: Paul K. Pickard, Morrisville, NC (US); Michael James Harris, Cary, NC (US); Gary D. Trott, Morrisville, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 13/762,923

(22) Filed: Feb. 8, 2013

(65) Prior Publication Data

US 2014/0225511 A1    Aug. 14, 2014

(51) Int. Cl.
*H05B 37/02*    (2006.01)
*H05B 33/08*    (2006.01)

(52) U.S. Cl.
CPC ........ *H05B 33/0848* (2013.01); *H05B 37/0218* (2013.01); *Y02B 20/46* (2013.01)

(58) Field of Classification Search
CPC ............................... H05B 37/02; Y02B 20/46
USPC ................................................ 315/151, 313
See application file for complete search history.

(56) References Cited

U.S. PATENT DOCUMENTS

| | | | |
|---|---|---|---|
| 4,467,246 A * | 8/1984 | Tanaka | G03B 27/527 315/135 |
| 4,946,547 A | 8/1990 | Palmour | |
| 5,200,022 A | 4/1993 | Kong | |
| RE34,861 E | 2/1995 | Davis et al. | |
| 6,350,041 B1 | 2/2002 | Tarsa | |
| 6,548,832 B1 | 4/2003 | Sakamoto et al. | |
| 7,202,613 B2 * | 4/2007 | Morgan | A01M 1/04 315/312 |
| 7,224,000 B2 | 5/2007 | Aanegola et al. | |
| D570,797 S | 6/2008 | Song | |
| D573,553 S | 7/2008 | Uemoto et al. | |
| D576,576 S | 9/2008 | Shida et al. | |
| 7,482,636 B2 | 1/2009 | Murayama et al. | |
| 7,492,108 B2 * | 2/2009 | Garcia | H05B 33/0851 315/291 |

(Continued)

FOREIGN PATENT DOCUMENTS

CN    ZL 2011-30139847.5    8/2012
CN    ZL 2011-30166527.9    8/2012

(Continued)

OTHER PUBLICATIONS

Bridgelux Product Data Sheet—1 page.
(Continued)

*Primary Examiner* — Tung X Le
*Assistant Examiner* — Srinivas Sathiraju
(74) *Attorney, Agent, or Firm* — Jenkins, Wilson, Taylor & Hunt, P.A.

(57) ABSTRACT

Light emitting device (LED) light fixture control systems and related methods are disclosed. A system and method in one aspect can include at least one LED configured to emit light at an illumination output level and at least one light sensor configured to measure the illumination output level of light emitted by the LED. A system and method can also include a control unit configured to detect the illumination output level emitted by the at least one LED falling below an original illumination output level and to increase the illumination output level by the at least one LED to produce a predetermined lighting level associated with the original illumination output level in an area.

68 Claims, 7 Drawing Sheets

(56) References Cited

U.S. PATENT DOCUMENTS

| | | | |
|---|---|---|---|
| D589,470 S | 3/2009 | Chen | |
| D591,248 S | 4/2009 | Imai et al. | |
| D593,043 S | 5/2009 | Song | |
| 7,538,499 B2* | 5/2009 | Ashdown | H05B 33/0803 315/118 |
| 7,545,499 B2* | 6/2009 | Overbeck et al. | 356/429 |
| 7,550,931 B2* | 6/2009 | Lys | A01M 1/04 315/291 |
| 7,573,209 B2* | 8/2009 | Ashdown | H05B 33/0818 315/149 |
| D602,451 S | 10/2009 | Gielen | |
| D603,813 S | 11/2009 | Nishimura et al. | |
| 7,614,759 B2 | 11/2009 | Negley | |
| D607,420 S | 1/2010 | Imai et al. | |
| D615,052 S | 5/2010 | Imai et al. | |
| D618,635 S | 6/2010 | Imai et al. | |
| 7,825,578 B2 | 11/2010 | Takashima et al. | |
| 7,872,418 B2 | 1/2011 | Hata et al. | |
| D637,564 S | 5/2011 | Tseng et al. | |
| 7,994,518 B2 | 8/2011 | Wang et al. | |
| D645,417 S | 9/2011 | Imai et al. | |
| 8,044,418 B2 | 10/2011 | Loh et al. | |
| 8,058,088 B2 | 11/2011 | Cannon | |
| D650,760 S | 12/2011 | Hussell et al. | |
| 8,125,159 B2* | 2/2012 | Aiello | 315/274 |
| 8,125,315 B2* | 2/2012 | Veskovic | H05B 37/0254 340/4.3 |
| D667,803 S | 9/2012 | Hussell et al. | |
| 8,264,155 B2* | 9/2012 | Negley | H05B 33/089 315/129 |
| D676,000 S | 2/2013 | Hussell et al. | |
| D676,395 S | 2/2013 | Hussell et al. | |
| 8,400,071 B2* | 3/2013 | Gaines | H05B 33/0815 315/185 S |
| 8,455,908 B2 | 6/2013 | Welch et al. | |
| 8,456,092 B2* | 6/2013 | Knapp | H04L 12/43 315/152 |
| 8,521,035 B2* | 8/2013 | Knapp | H04L 12/43 315/158 |
| 8,563,339 B2 | 10/2013 | Tarsa et al. | |
| 8,564,000 B2 | 10/2013 | Hussell et al. | |
| 8,610,373 B2* | 12/2013 | Boeke | 315/291 |
| 8,624,271 B2 | 1/2014 | Hussell et al. | |
| 8,674,913 B2* | 3/2014 | Knapp | H04L 12/40013 345/82 |
| D702,653 S | 4/2014 | Wilcox et al. | |
| 8,729,454 B2* | 5/2014 | Hilgers | H01L 27/1443 250/226 |
| 8,780,033 B2* | 7/2014 | Fujii | G02F 1/13318 345/102 |
| 8,872,442 B2* | 10/2014 | Fushimi | H05B 37/02 315/149 |
| 2005/0145775 A1* | 7/2005 | Cristoni | H05B 33/0854 250/205 |
| 2006/0186418 A1 | 8/2006 | Edmond | |
| 2007/0018295 A1 | 1/2007 | Kim et al. | |
| 2007/0029569 A1 | 2/2007 | Andrews | |
| 2007/0158668 A1 | 7/2007 | Tarsa | |
| 2007/0285027 A1 | 12/2007 | Gehman | |
| 2008/0054279 A1 | 3/2008 | Hussell et al. | |
| 2008/0054284 A1 | 3/2008 | Hussell et al. | |
| 2008/0054286 A1 | 3/2008 | Loh et al. | |
| 2008/0173884 A1 | 7/2008 | Chitnis et al. | |
| 2008/0179611 A1 | 7/2008 | Chitnis et al. | |
| 2008/0224166 A1 | 9/2008 | Glovatsky et al. | |
| 2008/0258130 A1 | 10/2008 | Bergmann | |
| 2009/0261374 A1 | 10/2009 | Hayashi | |
| 2009/0289169 A1 | 11/2009 | Yang et al. | |
| 2009/0315061 A1 | 12/2009 | Andrews | |
| 2010/0045191 A1* | 2/2010 | Aendekerk | G05D 25/02 315/152 |
| 2010/0078664 A1 | 4/2010 | Helbing | |
| 2010/0141182 A1 | 6/2010 | Shi | |
| 2010/0155763 A1 | 6/2010 | Donofrio | |
| 2010/0253248 A1 | 10/2010 | Shi | |
| 2010/0270567 A1 | 10/2010 | Emerson et al. | |
| 2010/0320483 A1 | 12/2010 | Kadotani et al. | |
| 2011/0063214 A1* | 3/2011 | Knapp | H04L 12/43 345/158 |
| 2011/0063268 A1* | 3/2011 | Knapp | H04L 12/42 345/207 |
| 2011/0084616 A1* | 4/2011 | Negley et al. | 315/154 |
| 2011/0128730 A1 | 6/2011 | Chiu | |
| 2011/0285526 A1* | 11/2011 | Tanaka | H05B 33/0884 340/514 |
| 2011/0291151 A1 | 12/2011 | Matsuda et al. | |
| 2012/0025717 A1 | 2/2012 | Klusmann et al. | |
| 2012/0126257 A1 | 5/2012 | Reiherzer et al. | |
| 2012/0184299 A1* | 7/2012 | Loveland | G05B 15/02 455/456.3 |
| 2012/0193651 A1 | 8/2012 | Edmond | |
| 2012/0194081 A1* | 8/2012 | Boeke | H05B 33/0854 315/151 |
| 2012/0205689 A1 | 8/2012 | Welch | |
| 2012/0286673 A1* | 11/2012 | Holland | H05B 33/0854 315/155 |
| 2012/0299022 A1 | 11/2012 | Hussell | |
| 2012/0299486 A1 | 11/2012 | Birru | |
| 2013/0009551 A1* | 1/2013 | Knapp | H05B 33/0869 315/152 |
| 2013/0147365 A1* | 6/2013 | Takahashi | 315/151 |
| 2014/0225511 A1* | 8/2014 | Pickard | H05B 37/0218 315/151 |

FOREIGN PATENT DOCUMENTS

| | | |
|---|---|---|
| CN | ZL201230099913.5 | 11/2012 |
| CN | ZL201230099954.4 | 12/2012 |
| CN | ZL201230099981.1 | 12/2012 |
| CN | 103270614 | 8/2013 |
| EP | 2327930 | 6/2011 |
| JP | 07-038940 | 9/1995 |
| JP | 10-311937 | 11/1998 |
| JP | 2001-294083 | 10/2001 |
| JP | 2005-266117 | 9/2005 |
| JP | 2006-294898 | 10/2006 |
| JP | 2007-227680 | 9/2007 |
| JP | 2007-323857 | 12/2007 |
| JP | 2007-335371 | 12/2007 |
| JP | 2009-044055 | 2/2009 |
| JP | 2009-289918 | 12/2009 |
| JP | 2010-009972 | 1/2010 |
| KR | 10-0793338 | 1/2008 |
| KR | 10-2008-0092239 | 10/2008 |
| KR | 10-2009-0011121 | 2/2009 |
| KR | 10-2011-0004632 | 1/2011 |
| TW | 113260 | 10/2006 |
| TW | 124444 | 8/2008 |
| TW | 128526 | 5/2009 |
| WO | WO 2012/071136 | 5/2012 |
| WO | WO 2012/071138 | 5/2012 |
| WO | WO 2012/071139 | 5/2012 |
| WO | WO 2013/032737 | 3/2013 |
| WO | WO 2014/123721 A1 | 8/2014 |

OTHER PUBLICATIONS

Citizen Co. Product Data Sheet—4 pages http://ce.citizen.co.jp/lighting_led/en/products/index.html.
Notice of Allowance for U.S. Appl. No. 29/379,636 dated Aug. 4, 2011.
Notification of Granting Patent Right for Design for Application Serial No. CN 2011/30166527.9 dated Apr. 6, 2012.
Non-Final Office Action for U.S. Appl. No. 29/380,387 dated Apr. 25, 2012.
Notification of Granting Patent Right for Design for Application Serial No. CN 2011/30139847.5 dated Apr. 26, 2012.
Notice of Allowance for U.S. Appl. No. 29/408,955 dated May 7, 2012.
Notice of Allowance for U.S. Appl. No. 29/407,084 dated May 18, 2012.
International Search Report and Written Opinion for Application Serial No. PCT/US2011/058603 dated May 23, 2012.

(56) References Cited

OTHER PUBLICATIONS

International Search Report and Written Opinion for Application Serial No. PCT/US2011/058601 dated May 24, 2012.
International Search Report and Written Opinion for Application Serial No. PCT/US2011/058596 dated Jun. 18, 2012.
Chinese Office Action for Application Serial No. CN 2012/30130915.6 dated Jul. 12, 2012.
Notification of Grant for Chinese Patent Application No. 2012/30099913.5 dated Aug. 7, 2012.
Notification of Grant for Chinese Patent Application No. 2012/30099981.1 dated Aug. 17, 2012.
Notification of Grant for Chinese Patent Application No. 2012/30099954.4 dated Aug. 17, 2012.
Notice of Allowance for U.S. Appl. No. 29/407,084 dated Aug. 21, 2012.
Notice of Allowance for U.S. Appl. No. 29/380,387 dated Sep. 18, 2012.
Notice of Allowance for U.S. Appl. No. 29/408,955 dated Oct. 4, 2012.
Chinese Office Action for Application No. CN 2012/30130915.6 dated Oct. 24, 2012.
Chinese Office Action for Application No. 201230472866.4 dated Nov. 14, 2012.
Non-Final Office Action for U.S. Appl. No. 13/104,558 dated Jan. 3, 2013.
Taiwanese Search Report for Application No. 101302309 dated Jan. 14, 2013.
Taiwanese Office Action for Application No. 101302309 dated Jan. 23, 2013.
Chinese Decision to Grant for Application No. 201230472866.4 dated Jan. 24, 2013.
Notice of Allowance for U.S. Appl. No. 13/336,540 dated Jan. 31, 2013.
Restriction Requirement for U.S. Appl. No. 13/671,089 dated Feb. 7, 2013.
Restriction Requirement for U.S. Appl. No. 29/404,913 dated Feb. 15, 2013.
Japanese Office Action for Application No. 2012-023963 dated Feb. 26, 2013.
Japanese Office Action for Application No. 2012-026117 dated Feb. 26, 2013.
Chinese Office Action for Application No. CN 2012/30130915.6 dated Feb. 27, 2013.
International Search Report and Written Opinion for Application No. PCT/US2012/051344 dated Feb. 28, 2013.
International Search Report and Written Opinion for Application No. PCT/US2012/063861 dated Mar. 18, 2013.
Non-Final Office Action for U.S. Appl. No. 13/671,089 dated Mar. 29, 2013.
International Search Report and Written Opinion for Application No. PCT/US2012/070589 dated Apr. 22, 2013.
Final Rejection mailed for U.S. Appl. No. 11/899,790 dated Feb. 25, 2014.
International Search Report for Application No. PCT/US2014/013325 dated May 14, 2014.

* cited by examiner

LIGHT EMITTING DEVICE (LED) LIGHT FIXTURE CONTROL SYSTEMS AND RELATED METHODS

TECHNICAL FIELD

The subject matter disclosed herein relates generally to light emitter packages, systems, and methods. More particularly, the subject matter disclosed herein relates to light emitting device (LED) light fixture control systems and related methods having improved performance at a lower cost.

BACKGROUND

Light emitting devices, such as light emitting diodes or devices (LEDs), are widely used for providing cost effective illumination in commercial and residential locations. Currently, two approaches for managing and controlling light output from LED fixtures are commonly utilized in the current marketplace. The first approach involves producing the most efficient LED light fixture and allowing the fixture to lose lumens over a period of time. Such LED light fixtures are typically designed with 10-15% more lumens than are actually needed to illuminate a given space, thereby allowing the LED light fixture to provide the "rated" illumination level at the midpoint of the fixture's designed lifespan. Thus, an LED light fixture designed in this manner provides excess illumination for the first half of its lifespan and depreciated lighting levels (i.e., receding from the rated lighting level) for the second half of its lifespan.

The second approach for managing and controlling LED light fixture output involves the utilization of a circuit that is designed to increase power to the LED light fixture over time in order to maintain the light output at an initial rated light level. While obviating the need to design for an average/mean lumen output because the light level does not change during the useful life of the fixture, this approach may be less desirable from a code compliance perspective since the wattage for the fixture must be defined by its "ending" power and not its initial power. Moreover, LED light fixtures of this type may also include a circuit that is designed to flash or provide some other visible "end of life" indication when the fixture is unable to maintain the initial light level or when the lumen level has dropped below a predetermined threshold. While such a visual indication can be useful for alerting facility maintenance personnel to replace the fixture, there are many other applications that may use depreciated LED light fixtures that do not include a built-in visual alert. Namely, LED light fixtures that include the aforementioned visual indication mechanisms are effectively rendered useless for applications that are able utilize fixtures with depreciating lighting.

Thus, despite various approaches to utilize LED light fixtures in an efficient manner, a need remains for further operating solutions that provide cost effective illumination using LED light fixtures.

SUMMARY

In accordance with this disclosure, novel light emitting device (LED) light fixture control systems and related methods are provided and described herein. It is, therefore, an object of the disclosure herein to provide exemplary systems and methods that can include at least one LED configured to emit light at an illumination output level and at least one light sensor configured to measure the illumination output level of light emitted by the LED. The system can also comprise a control unit configured to detect the illumination output level emitted by the at least one LED falling below an original illumination output level and to increase the illumination output level by the at least one LED to produce a predetermined lighting level associated with the original illumination output level in an area.

The subject matter described herein can be implemented in hardware, software, firmware, or any combination thereof. As such, the terms "function" or "module" as used herein refer to hardware, which can also comprise software and/or firmware components, for implementing the feature being described. In one exemplary implementation, the subject matter described herein can be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

These and other objects of the present disclosure as can become apparent from the disclosure herein are achieved, at least in whole or in part, by the subject matter disclosed herein.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The subject matter disclosed herein is directed to light emitting diode or device (LED) light fixture control systems and related methods that provide lighting conditions in a more efficient manner. In one aspect, a lighting system can be provided comprising a control system that can be used to operate and manage a plurality of LED light fixtures positioned in a defined area. The control system can also utilize light sensors to obtain illumination output information associated with the plurality of LED light fixtures and/or ambient lighting in the defined area in order to operate the LED light fixtures in the most efficient manner. By optimizing operation of the plurality of LED light fixtures, sufficient lighting can be provided, automatically or otherwise such as by a system administrator, while extending the life of LED light fixtures and conserving valuable energy.

Figure 1:
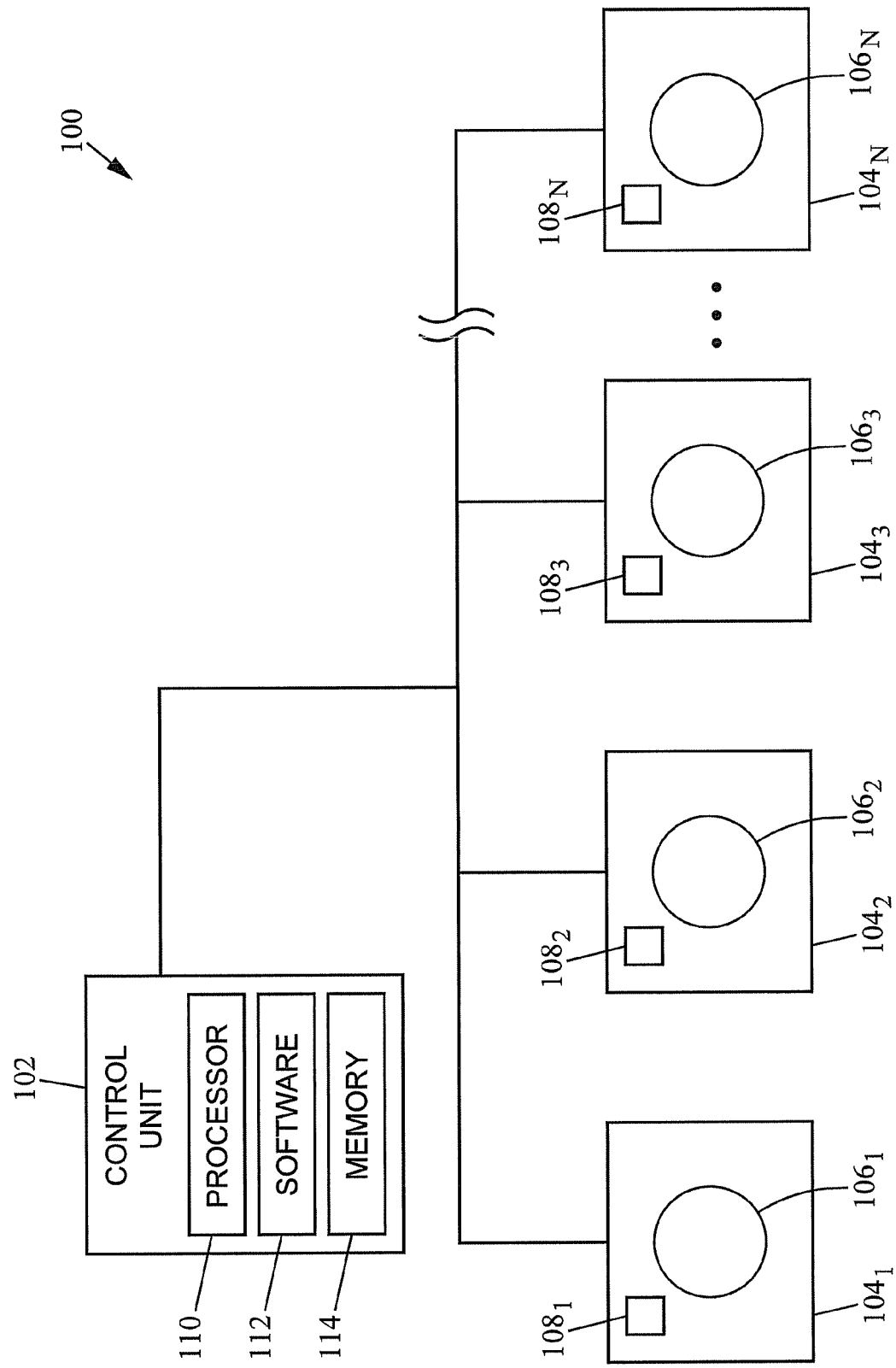
FIG. 1 is a block diagram illustrating an LED light fixture control system according to one aspect of the disclosure herein.

Referring to FIG. 1, a lighting control system generally designated 100 can comprise a control unit 102 configured to operate and manage, such as automatically, one or more lights or light sources, such as one or more of LED light fixtures $104_1 \ldots _n$. Although not depicted in FIG. 1, each of LED light fixtures $104_1 \ldots _n$ can be configured to comprise a light emitting diode (LED) driver circuit that is coupled to a LED string circuit, both of which can be mounted on a surface of a substrate. The term "mounted on" as used herein can comprise configurations where an LED chip a LED package can be physically and/or electrically connected to a portion of the substrate via solder, epoxy, silicone, adhesive, glue, paste, and/or any other suitable attachment material and/or method. The LED driver circuit can be coupled to an AC voltage power source, which can provide an alternating electrical signal (current and voltage) to the LED string circuit and other circuits that cause light to be emitted. For example, the LED string circuit in each LED light fixture 104 can comprise multiple LED chips (or other solid state light emitters) arranged as multiple groups or sets of LEDs, wherein each group or set is preferably separately controllable relative to each other group or set. In some aspects, LED string circuit can comprise a multi-dimensional (e.g., two-dimensional) array of LED chips. The LED chips can be optionally arranged in one or more mutually exclusive groups, segments, or sets of LED chips.

Figure 2:
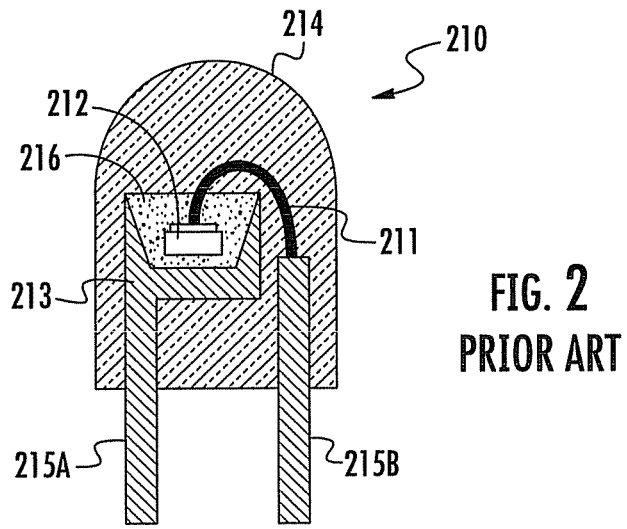
FIG. 2 shows a sectional view of one embodiment of a prior art LED lamp.

In general, light emitting diodes comprise one or more active layers of semiconductor material sandwiched between oppositely doped layers. When a bias is applied across the doped layers, holes and electrons are injected into the active layer where they recombine to generate light. Light is emitted from the active layer and from various surfaces of the LED. In order to use an LED chip in a circuit or other like arrangement, it is known to enclose an LED chip in a package to provide environmental and/or mechanical protection, color selection, light focusing and the like. An LED package can also comprise electrical leads, contacts or traces for electrically connecting the LED package to an external circuit. In an LED package 210 illustrated in FIG. 2, a single LED chip 212 can be mounted on a reflective cup 213 by a solder bond or conductive epoxy. One or more wire bonds 211 can connect the ohmic contacts of LED chip 212 to leads 215A and/or 215B, which can be attached to or integral with the reflective cup 213. Reflective cup 213 can be filled with an encapsulant material 216 which can contain a wavelength conversion material such as a phosphor. Light emitted by the LED at a first wavelength can be absorbed by the phosphor, which can responsively emit light at a second wavelength. The entire assembly can then be encapsulated in a clear protective resin 214, which can be molded in the shape of a lens to collimate the light emitted from LED chip 212. While reflective cup 213 can direct light in an upward direction, optical losses can occur when the light is reflected (i.e. some light can be absorbed by the reflective cup due to the less than 100% reflectivity of practical reflector surfaces). In addition, heat retention can be an issue for a package such as LED package 210 shown in FIG. 2, since it may be difficult to extract heat through the leads 215A, 215B.

Figure 3:
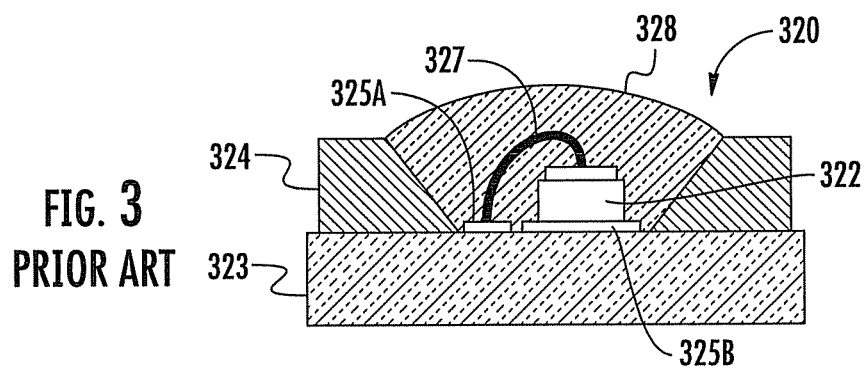
FIG. 3 shows a sectional view of another embodiment of a prior art LED package.

A conventional LED package 320 illustrated in FIG. 3 can be more suited for high power operations which may generate more heat. In LED package 320, one or more LED chips 322 can be mounted onto a carrier such as a printed circuit board (PCB) carrier, substrate or submount 323. A metal reflector 324 mounted on the submount 323 surrounds LED chips 322 and reflects light emitted by LED chips 322 away from LED package 320. Reflector 324 can also provide mechanical protection to LED chips 322. One or more wirebond connections 327 are made between ohmic contacts on LED chips 322 and electrical traces 325A, 325B on submount 323. Mounted LED chips 322 can then be covered with an encapsulant 326, which can provide environmental and mechanical protection to the chips while also acting as a lens. Metal reflector 324 is can be attached to the carrier by a solder or epoxy bond.

LED chips, such as those found in LED package 320 of FIG. 3 can be coated by conversion material comprising one or more phosphors, with the phosphors absorbing at least some of the LED light. The LED chip can emit a different wavelength of light such that it emits a combination of light from the LED and the phosphor. The LED chip(s) can be coated with a phosphor using many different methods, with one suitable method being described in U.S. patent application Ser. Nos. 11/656,759 and 11/899,790, both to Chitnis et al. and both entitled "Wafer Level Phosphor Coating Method and Devices Fabricated Utilizing Method". Alternatively, the LEDs can be coated using other methods such as electrophoretic deposition (EPD), with a suitable EPD method described in U.S. patent application Ser. No. 11/473,089 to Tarsa et al. entitled "Close Loop Electrophoretic Deposition of Semiconductor Devices".

In some aspects, one or more LED chips, and notably, portions of light emitter packages such as portions of the ceramic based submount, lens, and/or traces can be at least partially coated with one or more phosphors. The phosphors can absorb a portion of light from the LED chip and emit a different wavelength of light such that the light emitter package emits a combination of light from each of the LED chip and the phosphor. For example, in some aspects, the light emitter package emits what is perceived as white light resulting from a combination of light emission from the LED chip and the phosphor. In some aspects, a white emitting package can comprise an LED chip that emits light in the blue wavelength spectrum and a phosphor that absorbs some of the blue light and re-emits light in the yellow wavelength spectrum. The package can therefore emit a white light combination of blue and yellow light.

Figure 4:
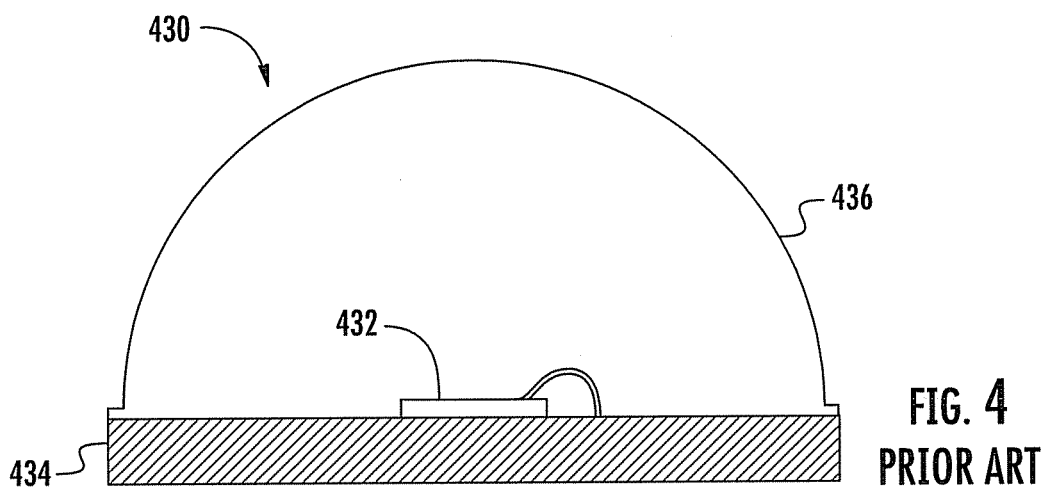
FIG. 4 shows a sectional view of still another embodiment of a prior art LED package.

Another conventional LED package 430 shown in FIG. 4 comprises an LED 432 on a submount 434 with a hemispheric lens 436 formed over it. LED 432 can be coated by a conversion material that can convert all or most of the light from the LED. The hemispheric lens 436 is arranged to minimize total internal reflection of light. The lens is made relatively large compared to LED 432 so that LED 432 approximates a point light source under the lens. As a result, the amount of LED light that reaches the surface of lens 436 is maximized to maximize the amount of light that emits from lens 436 on the first pass. This can result in relatively large devices where the distance from the LED to the edge of the lens is maximized, and the edge of the submount can extend out beyond the edge of the encapsulant. Further, these devices generally produce a Lambertian emission pattern that is not always ideal for wide emission area applications. In some conventional packages the emission profile can be approximately 120 degrees full width at half maximum (FWHM).

Lamps have also been developed utilizing solid state light sources, such as LEDs, in combination with a conversion material that is separated from or remote to the LEDs. Such arrangements are disclosed in U.S. Pat. No. 6,350,041 to Tarsa et al., entitled "High Output Radial Dispersing Lamp Using a Solid State Light Source." The lamps described in this patent can comprise a solid state light source that transmits light through a separator to a disperser having a phosphor. The disperser can disperse the light in a desired pattern and/or changes its color by converting at least some of the light to a different wavelength through a phosphor or other conversion material. In some embodiments the separator spaces the light source a sufficient distance from the disperser such that heat from the light source will not transfer to the disperser when the light source is carrying elevated currents necessary for room illumination. Additional remote phosphor techniques are described in U.S. Pat. No. 7,614,759 to Negley et al., entitled "Lighting Device".

Figure 5:
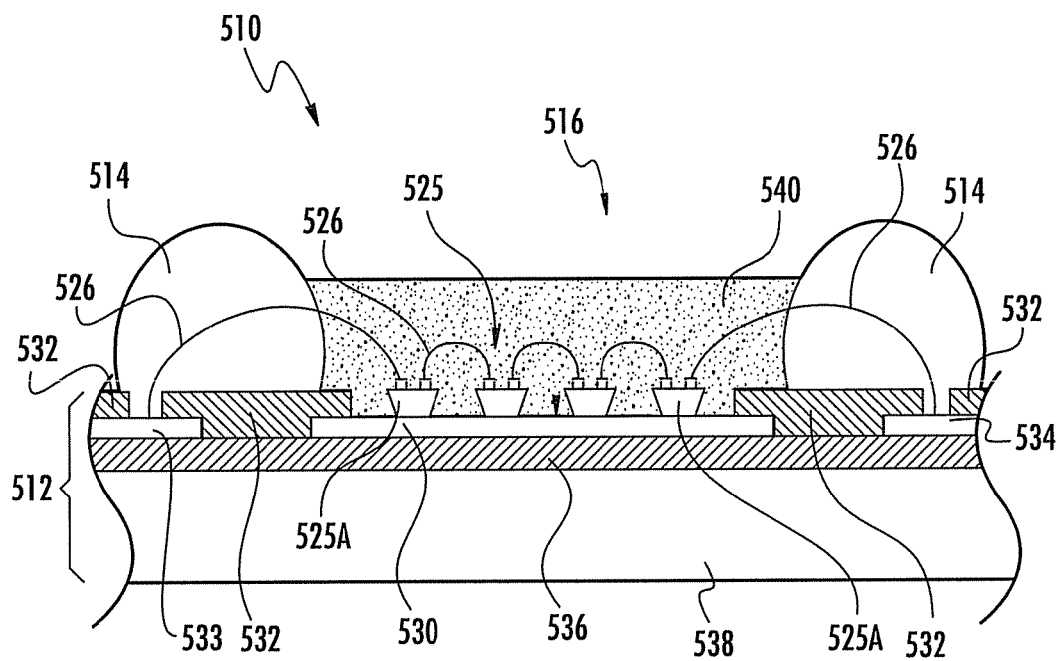
FIG. 5 illustrates a cross-sectional view of a light emission area of a LED device according to the disclosure herein.

A cross-sectional view of a light emission area of an exemplary LED light fixture (generally designated 510) is depicted in FIG. 5. LED device 510 can comprise a submount 512 over which an emission area, generally designated 516, can be disposed. As described in more detail below, emission area 516 can be configured to comprise one or more LED chips 525. In one aspect, emission area 516 can be disposed substantially centrally with respect to LED device 510 (e.g., from a top-down view). In the alternative, emission area 516 can be disposed in any location over LED device 510, for example, in a corner or adjacent an edge. LED device 510 can comprise a single emission area 516 or more than one emission area 516. Notably, LED device 510 can comprise a uniform optical source in the form of emission area which can simplify the manufacturing process for manufacturers of light products requiring a single component.

Submount 512 can comprise any suitable mounting substrate, for example, a printed circuit board (PCB), a metal core printed circuit board (MCPCB), an external circuit, or any other suitable substrate over which lighting devices such as LEDs can mount and/or attach. Submount 512 can comprise, for example, conductive pad 530, first and second conductive traces 533 and 534, and solder mask 532 at least partially disposed between conductive pad 530 and each of conductive traces 533 and/or 534. Submount 512 can further comprise a dielectric layer 536, and a core layer 538. For illustration purposes, submount 512 can comprise a MCPCB or any other suitable submount. Core layer 538 can comprise a conductive metal layer, for example Cu or aluminum (Al). Dielectric layer 536 can comprise an electrically insulating but thermally conductive material to assist with heat dissipation through submount 512.

Emission area 516 can be in electrical and/or thermal communication with submount 512. One or more intervening layers can be disposed between emission area 516 and submount 512 such that emission area 516 is indirectly disposed over submount 12 thereby indirectly electrically and/or thermally communicating with submount 512. In the alternative, emission area 516 can directly mount over submount 512 thereby directly electrically and/or thermally communicating, or connecting, with submount 512

Emission area 516 can comprise one or more LED chips, or LEDs 525 disposed within and/or below a filling material 540. For illustration purposes, four LEDs 525 are shown but strings of LEDs 525 can comprise any suitable number of LEDs. Alternatively, a single LED 525 can be utilized. LEDs 525 can comprise any suitable size and/or shape. For example, LEDs 525 can have a rectangle, square, or any other suitable shape. In one aspect, filling material 540 can comprise an encapsulant having a predetermined, or selective, amount of phosphors and/or lumiphors in an amount suitable for any desired light emission, for example, suitable for white light conversion. Filling material 540 can interact with light emitted from the plurality of LEDs 525 such that a perceived white light, or any suitable and/or desirable wavelength of light, can be observed. Any suitable combination of encapsulant and/or phosphors can be used, and combinations of different phosphors for resulting in desired light emission can be used.

LED device 510 can further comprise a retention material 514 disposed at least partially about emission area 516 where retention material 514 can be referred to as a dam. Retention material 514 can be adapted for dispensing, or placing, about at least a portion of emission area 516. After placement of retention material 514, filling material 540 can be selectively filled to any suitable level within the space disposed between one or more inner walls of retention material 514. For example, filling material 540 can be filled to a level equal to the height of retention material 514 or to any level above or below retention material. The level of filling material 540 can be planar or curved in any suitable manner, such as concave or convex. In some aspects, retention material 514 can be arranged at least partially over each of solder mask 532 and wirebond 526 connecting to conductive traces 533 and 534. FIG. 5 further illustrates filling material 540 disposed over the one or more LEDs 525. Filling material 540 can be selectively filled to any suitable level higher, lower, or equal to the height of retention material 514. Wirebonds 526 of the outermost LEDs 525A as shown can be at least partially disposed within retention material 514.

Figure 6:
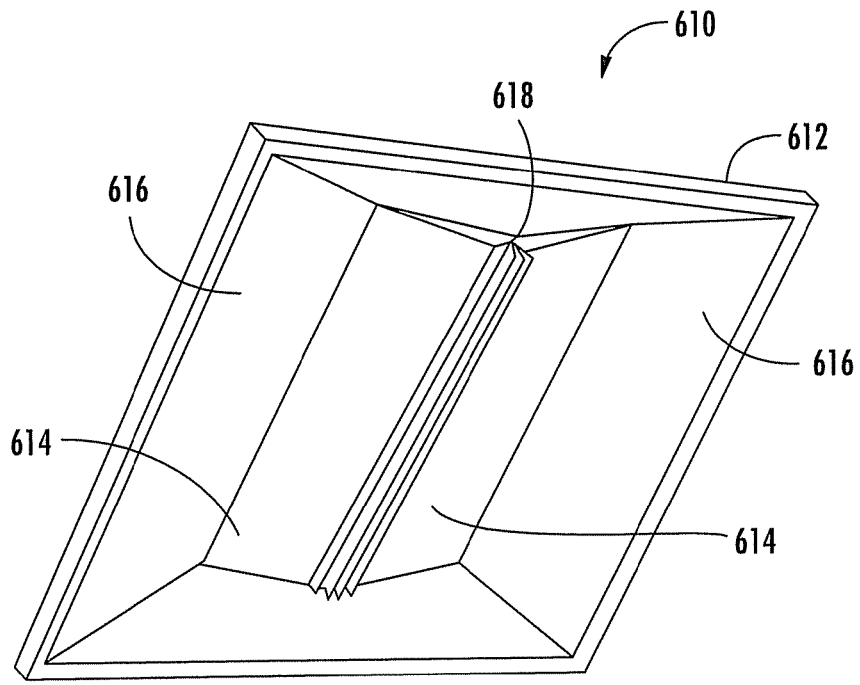
FIG. 6 is a perspective view of a prior art troffer-based LED lighting fixture.

The exemplary LED devices described above can be included in any type of lighting fixture (e.g., a downlight-type, a troffer-type, a surface mountable type, etc.) without departing from the scope of the present subject matter. As an example, FIG. 6 illustrates an exemplary troffer-type lighting fixture, generally designated as 610, that can be designed to mount in a ceiling. In most applications, troffer-type lighting fixtures can be mounted into a drop ceiling (not shown) of a commercial, educational, or governmental facility. As illustrated in FIG. 6, lighting fixture 610 can comprise a square or rectangular outer frame 612. In the central portion of lighting fixture 610 are two rectangular lenses 614, which can be transparent, translucent, or opaque. Reflectors 616 can extend from the outer frame 612 to the outer edges of lenses 614. In one aspect, lenses 614 can effectively extend between the innermost portions of reflectors 616 to an elongated heat sink 618, which functions to join the two inside edges of the lenses 614.

Figure 7:
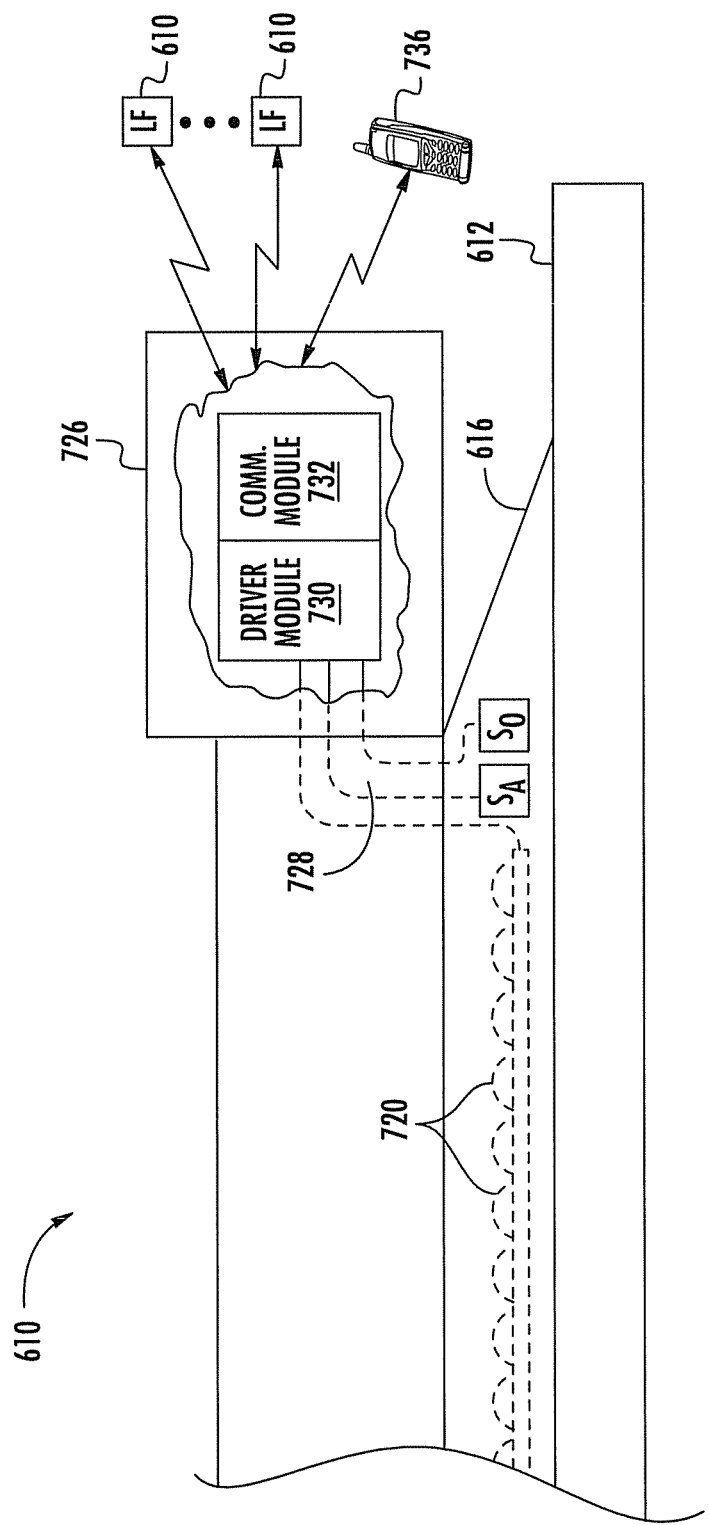
FIG. 7 illustrates a driver module and a communications module integrated within an electronics housing of an LED lighting fixture according to the disclosure herein.

In some aspects, one or more lighting fixtures in a lighting system can be configured to be controlled in a wired and/or wireless manner. For example, FIG. 7 illustrates a plurality of modules integrated within an electronics housing that can be mounted at one end of an LED lighting fixture (e.g., lighting fixture 610 shown in FIG. 6) and is used to house all or a portion of the electronics used to power and control an LED array 720. These electronics can be coupled to LED array 720 through appropriate cabling 728. With reference to FIG. 7, the electronics provided in electronics housing 726 can be divided into a driver module 730 and a communications module 732.

At a high level, driver module 730 can be coupled to LED array 720 through cabling 728 and can directly drive the LEDs of LED array 720 based on control information provided by communications module 732. Driver module 730 can provide the intelligence for lighting fixture 610 and can be capable of driving the LEDs of LED array 720 in a desired fashion. Driver module 730 can be provided on a single, integrated module or divided into two or more sub-modules depending the desires of the designer.

In some aspects, communications module 732 can act as an intelligent communication interface that facilitates communications between driver module 730 and other lighting fixtures 610, a remote control system (not shown), or a portable remote controller 736, which can also be configured to communicate with a remote control system in a wired or wireless fashion. As noted above, these communications can comprise the sharing of sensor data, instructions, and any other data between the various lighting fixtures 610 in a lighting network. In essence, communications module 732 can function to coordinate the sharing of intelligence and data among lighting fixtures 610.

In the embodiment of FIG. 7, communications module 732 can be implemented on a separate printed circuit board (PCB) than driver module 730. The respective PCBs of driver module 730 and communications module 732 can be configured to allow the connector of the communications module 732 to plug into the connector of driver module 730, wherein communications module 732 can be mechanically mounted, or affixed, to driver module 730 once the connector of communications module 732 is plugged into the mating connector of driver module 730.

In some embodiments, a cable can be used to connect the respective connectors of driver module 730 and communications module 732, other attachment mechanisms can be used to physically couple the communications module 732 to the driver module 730, or driver module 730 and communications module 732 can be separately affixed to the inside of electronics housing 726. In such embodiments, the interior of electronics housing 726 can be sized appropriately to accommodate both driver module 730 and communications module 732. In many instances, electronics housing 726 can provides a plenum rated enclosure for both driver module 730 and communications module 732.

Referring back to FIG. 1, although control unit 102 is depicted as being directly connected to LED light fixtures $104_{1 \ldots n}$ (e.g., via wires), control unit 102 can be communicatively connected to fixtures $104_{1 \ldots n}$ via a wireless methodology (e.g., via radio frequency or WiFi) without departing from the scope of the present subject matter. Furthermore, although FIG. 1 depicts a plurality of LED light fixtures, a single LED light fixture can be operated and managed by control unit 102 without departing from the scope of the present subject matter. In one embodiment, control unit 102 can comprise a hardware based processor such as processing unit 110 (e.g., a computer microprocessor), software such as a software module 112, and memory such as a memory unit 114. Software module 112 can comprise a software or firmware program that, when executed by processing unit 110, enables a system administrator to manage the energy required to effectively light defined areas and spaces (e.g., a conference room, a group of offices, a lobby, and/or other rooms) within a commercial building, residential building, or the like. Notably, software module 112 can be configured to utilize illumination and/or ambient light readings to manage and adjust settings related to the illumination output of LED light fixtures $104_{1 \ldots n}$. Software module 112 can also be configured to alert a system administrator in the event one or more of LED light fixtures $104_{1 \ldots n}$ can no longer produce a designated or desired illumination output level. For example, software module 112 can enable control unit 102 to provide a visual alert, an audible alarm, and/or send a message (e.g., an SMS text message or email message) to the system administrator in the event the illumination output level of an LED light fixture falls below a predefined threshold. In one aspect, lighting control system 100 can be implemented without a centralized control unit 102. Namely, the present subject matter can distribute the control of the lighting system among one or more of light fixtures $104_{1 \ldots n}$ in a similar manner disclosed in U.S. Provisional Patent Application No. 61/738,749, filed on Dec. 12, 2012, the disclosure of which is incorporated herein by reference in its entirety.

In one aspect, each of LED light fixtures $104_{1 \ldots n}$ can comprise an LED such as for example any of LEDs $106_{1 \ldots n}$ that can each comprise an LED diode or chip that can be at least partially covered such as by a lens or encapsulant. Each of LED light fixtures $104_{1 \ldots n}$ can further comprise a light sensor such as for example any of light sensors $108_{1 \ldots n}$. Each of light sensors $108_{1 \ldots n}$ can be configured to detect and obtain readings of the illumination output level produced by LED lamps $106_{1 \ldots n}$. Such light sensors can comprise internal light sensors and can be configured to measure light in lumen levels. Moreover, light sensors $108_{1 \ldots n}$ can also be configured to detect and measure the ambient light level (e.g., sunlight reflected off of walls, work surfaces, and windows) in proximity to an associated LED light fixture $104_{1 \ldots n}$. Light sensors $108_{1 \ldots n}$ can also be configured to detect and measure light (e.g., an illumination output level) originating from the LED light fixtures that is reflected off of objects (e.g., work surfaces, paint, windows, etc.) in the designated area. Such light sensors can comprise room facing sensors and can be configured to measure light in footcandles. Notably, light sensors $108_{1 \ldots n}$ can comprise any combination of sensors configured to measure light in any measurement unit and manner. Thus, the illumination output level generated or emitted by LED light fixture $104_{1 \ldots n}$ and the surrounding light produced by sunlight or other proximate LED light fixtures can be measured and subsequently communicated to control unit 102. In one aspect, light sensors $108_{1 \ldots n}$ can also be configured to detect other light parameters, such as a color level.

In an alternate embodiment, LED light fixtures may not comprise or be amenable to built-in sensors, such as light sensors $108_{1 \ldots n}$. In such an embodiment, a separate ambient light sensing device (not shown) can be utilized in conjunction with an LED light fixture that is not equipped with a light sensor in order to detect and measure illumination levels in an area proximate to the LED light fixture. In one aspect, software module 112 of control unit 102 can comprise logic that is configured to receive readings from one or more external ambient sensors and use received information to assess light levels measured from one or more separate light sensing devices. Furthermore, the output of a separate light sensor can be calibrated to a plurality or grouping of light fixtures by control unit 102 if necessary. Similarly, a single separate light sensor can be configured monitor the light level in an area.

In one aspect, an LED itself can be used to function as a light sensor while in a non-light emitting state. Notably, an LED includes a diode that can be tuned to emit light and are packaged in translucent or semi-translucent enclosures. A photodiode light sensor is structurally similar but is configured to be sensitive to a wider range of light wavelengths. For example, an LED can be wired and multiplexed in a circuit such that the LED can be used for perform either a light emission function or a light sensing function at different times. Accordingly, any of LEDs $106_{1 \ldots n}$ can be configured in a non-light emitting state and used to detect and measure illumination levels (e.g., brightness and/or color). In one aspect, software module 112 of control unit 102 can comprise logic that is configured to receive readings from one or more non-light emitting LEDs and use the received information to assess the measured light levels (in a manner similar to data received from the abovementioned external light sensing devices).

After measuring the illumination output levels of an LED light fixture, the light sensor (e.g., light sensors $108_{1...n}$ or a stand-alone light sensing device) can send the illumination output measurement to control unit 102, which can store the measurement information in memory unit 114 and/or process the illumination measurement information to determine if the LED light fixtures are optimally configured in a manner described below.

In one aspect, system 100 can be utilized by a system administrator or operator to determine/establish a visual comfort level (VCL) in a defined space, such as an office or conference room, which is outfitted with LED light fixtures $104_{1...n}$. As used herein, visual comfort level is defined as an illumination or light level (e.g., measured in lumens, footcandles, lux, candelas, and the like) that is needed or desired for task efficiency and visual comfort in a particular defined space. In one aspect, the determination of a visual comfort level can be based on the judgment and/or preferences of the system administrator. For example, a system administrator can determine or establish a visual comfort level in an area by adjusting the illumination output of one or more of LED light fixtures $104_{1...n}$ until the desired lighting level in the area is achieved. A number of lighting parameters can contribute toward establishing a visual comfort level in an area or room. For example, lighting parameters such as, but not limited to, brightness and color can be adjusted to achieve a desired visual comfort level.

Once the visual comfort level is determined or established, an associated "high end trim level" for each of the LED light fixtures $104_{1...n}$ in the defined area is determined. In one aspect, control unit 102 can receive, from each of the LED light fixtures $104_{1...n}$ a measurement of the illumination output level that is required to produce the previously determined visual comfort level. Control unit 102 can subsequently (e.g., via processing unit 110 and software module 112) use the received illumination output level information to determine an associated high end trim level for each LED light fixture $104_{1...n}$. In one aspect, the term "high end trim level" refers to a portion or percentage of the LED light fixture's original illumination output that is set as a "new" maximum illumination output setting (i.e., designating a new upper limit). Thus, after a visual comfort level in an area is selected/designated, the illumination output level emitted by the LED light fixture is determined. This illumination output level (i.e., original illumination output level) can then be compared to the maximum original illumination output of the LED light fixture in order to derive a percentage, ratio, or other numerical relationship. This derived numerical relationship represents the high end trim level. Practically speaking, an LED light fixture that has a high end trim level set to 70% will only output 70% of its maximum illumination capability when placed on a "full on" setting. Thus, after a visual comfort level in an area is established and LED light fixtures $104_{1...n}$ communicate the illumination output information to control unit 102, control unit 102 can derive the high end trim level by determining the illumination output of each fixture with regard to that light fixture's original maximum output. For example, control unit 102 can determine that only 70% of the illumination output from a given LED light fixture was necessary to achieve the desired visual comfort level in a room. Consequently, the high end trim level (i.e., a new "full on" baseline) for that particular light fixture can be set to 70%. Therefore, from that point forward, the designated LED light fixtures will be dimmed to 70% of their initial (i.e., maximum) illumination output any time the light fixtures are turned on.

After a high end trim level is established, control unit 102 can be configured to trigger an optical calibration cycle for the LED light fixture. For example, software module 112 can comprise a clock mechanism or algorithm that determines when there is no ambient light available in the defined area. Control unit 102 can also initiate the optical calibration cycle on every LED light fixture $104_{1...n}$ in system 100 on an individual basis or by designated groupings. The illumination level output associated with each LED light fixture's high end trim setting can be stored in memory 114. Alternatively, the high end trim setting can be locally stored in a memory unit located within each respective LED light fixture (not shown).

In one aspect, the on/off optical calibration cycle can then be conducted periodically (e.g., daily, weekly, monthly, once every 6 months, etc.) such that control unit 102 utilizes illumination level readings to determine if the visual comfort level is maintained in a defined area on a regular basis. Periodic and/or frequent readings made by at least one light sensor in a defined area are desirable to accommodate for local changes, such as moving of furniture in the defined area, or environmental changes, such as the shortening or lengthening of daylight hours. For example, one purpose for taking periodic readings is to determine if the environment (e.g., paint, furniture, etc.) in the defined area has changed and thus affects the foot-candle lighting levels in the designated area. In one aspect, an illumination level reading can be taken during the evening on a nightly basis in order to cancel out external ambient light effects in the reading.

In some aspects, the high end trim level can be automatically maintained using a moving average of these periodic readings. For example, a moving average period can comprise a 3-day moving average, a one week moving average, or any customizable time period designated by the system administrator. Consequently, in such embodiments, a significant change to the lighting level in a defined area will not be made until the detected illumination level (e.g., reflected light and/or LED output) is more certain and clearly determined (e.g., via the use of a moving average). For example, the defined area may be subjected to a transient event (e.g., furniture temporarily covered with tarps) that could cause a significant adjustment to the high trim level, and thus the lighting level in the room, if only a single (i.e., non-moving average) reading was made.

In one aspect, control unit 102 can compare a current/present illumination output level that is associated with an LED light fixture with a previous illumination output level associated with the designated visual comfort level. If the presently measured illumination output level has fallen below the previous illumination measurement/reading, then an alert is sent to the system administrator and/or is exhibited at control unit 102. Upon receiving the alert, a system administrator can determine whether to i) let the light fixture degrade normally, ii) replace the fixture, or iii) reset/adjust the high end trim level to maintain the previously defined visual comfort level. In some aspects, control unit 102 can detect the illumination output level emitted by at least one LED falling below a previous illumination output level (e.g., an original illumination output level) in an area based on a moving average of light measurements (e.g., illumination output level measurements and/or reflected light measurements) taken by the at least one light sensor.

In one example, a visual comfort level for a conference room has been determined and associated with a 70% high end trim level with LED light fixtures rated at L70 of 50,000 hours (i.e., an LED light fixture whose efficiency degrades to 70% of its initial lumens after 50,000 hours of use). In such a scenario, the desired visual comfort level can be maintained for approximately 65,000 hours or more. If the LED light fixture cannot maintain the illumination output level associated with the previously established visual comfort level, control unit 102 can issue an alert to the administrator. The alert can comprise a visual alert and/or an audible alarm at control unit 102, an email and/or text message sent to a designated address/number, or the like. Upon receiving the alert, the administrator can make a determination as to how to address the problem. For example, the administrator can clear the alert/flag by allowing the lumen degradation of the LED light fixture to proceed normally, by having replacement fixtures installed, or by establishing a new high end trim level.

Although the present subject matter is described in one aspect in the context of LED-based light fixtures, system 100 can be used to compensate for the lumen depreciation in any other, suitable lighting or with any suitable light source, such as for example incandescent lighting, compact fluorescent lighting (CFL) and/or linear fluorescent lighting. Notably, similar calibrations can be performed with the fixture-level control circuitry set to alert control unit 102 of degraded lamps. Similarly, control unit 102 can be configured with internal logic that notes burnt-out lamps. Software (e.g., software module 112) can be configured with options or settings that can either be set to compensate for burnt-out lamps by providing more power to the surrounding lamps or fixtures, or to ignore burnt-out lamps and allow the remaining light fixtures to be uniformly lit.

Figure 8:
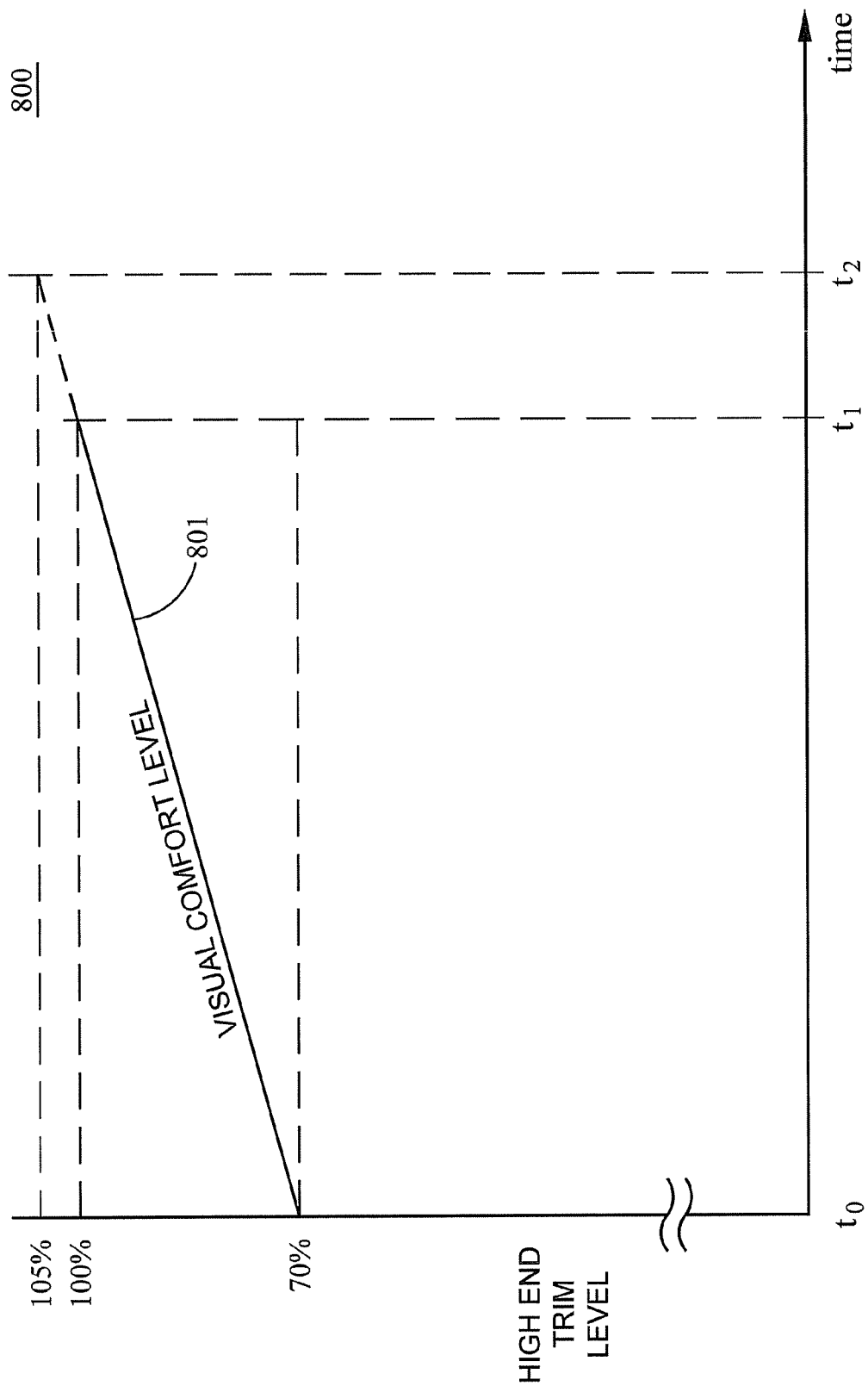
FIG. 8 is a chart diagram illustrating the graphical relationship between a visual comfort level and a high end trim level according to one aspect of the disclosure herein.

FIG. 8 depicts a graph chart illustrating the relationship between a visual comfort level and a high end trim level according to one aspect of the disclosure herein. FIG. 8 comprises a graph 800 illustrating a vertical axis representing the high end trim level percentage and a horizontal axis that represents elapsed time. Graph 800 also comprises a sloping line 801 that represents an established visual comfort level for a defined area. Notably, graph 800 illustrates that as time elapses, the high end trim level for a particular LED light fixture must be increased in order maintain the same visual comfort level over the elapsed time period. Notably, the degradation of the LED light fixture over time is considered. For example, at an initial time ($t_0$) after installing the LED light fixture, the visual comfort level is determined to be associated with a high end trim level of 70%. More specifically, the illumination output level of the LED light fixture that produces the desired visual comfort level is determined to be 70% of the LED light fixture's maximum illumination output power. As time elapses, graph 800 illustrates that in order to maintain the desired visual comfort level, the high end trim level must also be increased. For example, at time $t_1$, graph 800 illustrates that the high end trim level can be increased to 100% in order to provide/maintain the same visual comfort level that was established at time $t_0$. Notably, the relative increase in high end trim level over the time period defined as ($t_1$-$t_0$) can be attributed to the degradation of the LED lamp in the LED light fixture. At some point after $t_1$ (e.g., such as time $t_2$), the LED lamp will degrade to a point where the LED light fixture can no longer support the visual comfort level. For example, FIG. 8 illustrates that an impossible high end trim level equal to 105% would be required to maintain the visual comfort level at time $t_2$. At this time, a control unit would detect the degradation in the LED light fixture after receiving the corresponding illumination output level from an associated light sensor and issue a notification or alert to a system administrator.

Figure 9:
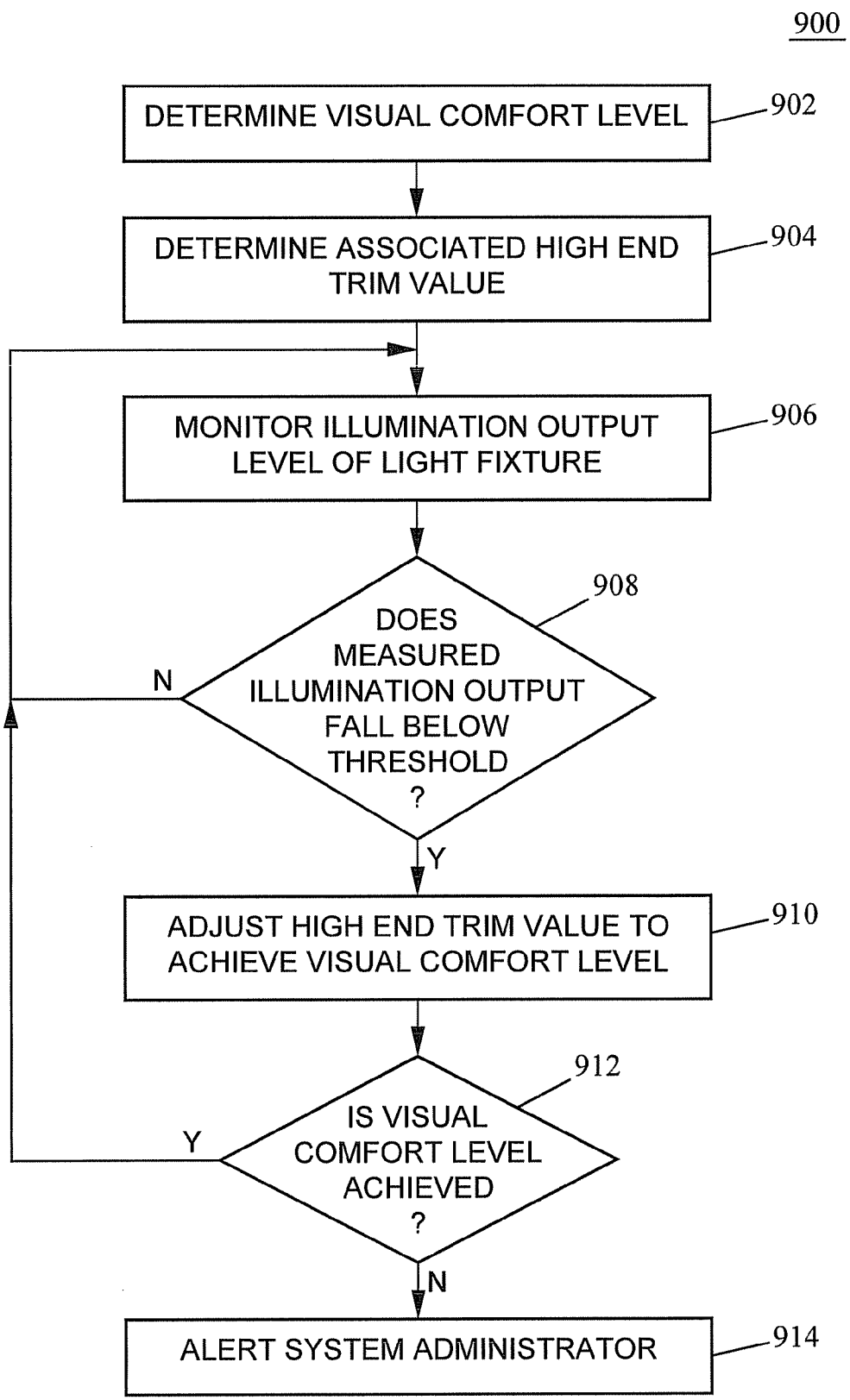
FIG. 9 is a flow chart illustrating an exemplary method for operating an LED light fixture control system according to one aspect of the disclosure herein.

FIG. 9 illustrates a flowchart of an exemplary method for utilizing a control system/unit to manage and operate a lighting system. In block 902, a visual comfort level is determined and/or established. In one embodiment, a system administrator can establish a visual comfort level (e.g., a level that is acceptable to a user based on a perceived illumination level, color temperature, and/or color level) existing in an area such as a defined area such as a conference room, a lobby, an office, or any other type of room or space. In one aspect, the visual comfort level can comprise a color temperature if the lighting system is configured to change color, such as using multiple different colored LEDs that are independently addressable. For example, the system administrator can vary the power output of the light fixture until a desired illumination level (e.g., measurable in lumens, foot-candles, lux, candelas, and the like) in the defined area is achieved. The system administrator can subsequently provide input data representing the visual comfort level to the control system/unit. In one aspect, the visual comfort level can comprise a predetermined lighting level or a desired lighting level. A visual comfort level can be a light level based upon an original illumination output level that can be detected or determined/established previously, such as not by a system administrator. For example, the original illumination output level can comprise a predetermined or preloaded value accessible to the control system/unit (e.g., in either a local or external data storage unit). Similarly, a system administrator or user can subsequently select a new visual comfort level that can be greater or less than a previously established visual comfort level in order to establish a new high end trim level.

As an example, a system administrator or other user (e.g., occupant of a room) can establish or determine a visual comfort level for a room by adjusting the lighting controls (e.g., a dimmer switch) until a desirable illumination and/or color temperature level is attained. In one scenario, a system administrator can enter a room with an illumination level of 60 footcandles, and upon deciding that the room is too bright, can adjust the lighting controls to a visual comfort level corresponding to 45 footcandles. In this scenario, the 45 footcandles associated with desired illumination level in the room can correspond to a light fixture illumination output of 800 lumens. Accordingly, the lighting system can equate the determined visual comfort level to 800 lumens by either receiving a signal from a dimmer (e.g., dimmer position) or receiving a signal from a light sensor (e.g., a measurement of lumens or footcandles). The system can also record/store the numerical value of 800 lumens as an original illumination output level as well as the numerical value of 45 footcandles as the visual comfort level. Alternatively, a light fixture output level and/or a visual comfort level can comprise a default value or a preloaded value that was established by the system administrator and stored in the lighting system.

In block 904, a high end trim level is determined. After the visual comfort level is determined in block 902, the associated illumination output level (e.g., an "original illumination output level") of the light fixture or fixtures in the defined area that is needed to achieve the aforementioned visual comfort level is measured. Using this measured illumination output level, a corresponding high end trim level can be determined. As mentioned above, a high end trim level can be represented as a percentage of the original maximum illumination output of a light fixture, which can then be set as a new "maximum illumination output" baseline. As used herein, the original maximum illumination output of a light fixture is the designed or manufactured maximum illumination output of the light fixture. Similarly, the new maximum illumination output baseline of the light fixture is the maximum illumination output the lighting system will permit the light fixture to produce upon designating the high end trim level (e.g., capping the maximum illumination level of the light fixture to correspond to the visual comfort level).

Returning to the aforementioned example, the high end trim level can be determined by the lighting system by considering the 800 lumens associated with the original illumination output level (and visual comfort level of 45 footcandles) with respect to the maximum output level of the light fixture. In one scenario, the LED light fixture can be rated as having a maximum illumination output of 1000 lumens. Accordingly, the high end trim value can be determined by the lighting system to be 80%, e.g., by dividing the original illumination output level (800 lumens) by the original maximum illumination output of the LED light fixture (1000 lumens). In an alternate embodiment, an initial default high end trim level based on a default visual comfort level (in footcandles) and/or a default illumination output level (in lumens) can be stored in the lighting system to prevent a user from adjusting/controlling a light fixture to produce an illumination output greater than the default level.

In block 906, the light fixture output is monitored. In one aspect, one or more light sensors can be used to measure the illumination output level emitted by one or more light fixtures. As indicated above, the light sensors can be incorporated with the light fixture or can be embodied as standalone light sensor devices. In one aspect, light sensor $108_1$ on light fixture $104_1$ measures the illumination output level emitted by light fixture $104_1$ and provides the illumination output information to control unit 102. Control unit 102 can be configured to compare the current illumination output information with a threshold value, such as the illumination output level that corresponds to the designated visual comfort level (e.g., the original illumination output level). In one aspect, light sensor $108_1$ on light fixture $104_1$ comprises a room facing sensor configured to measure/monitor the lighting level in the designated area. For example, the light sensor(s) can be configured to monitor the lighting level in the designated area (as opposed to the output of the light fixture) and detect if footcandle levels increase or decrease.

Returning to the aforementioned example, a light sensor can be utilized to measure the lumen level currently produced by the light fixture in the room. For example, a current lumen level of a light fixture can fall to 785 lumens and can be detected by a light sensor. The light fixture can also be configured to send a signal containing the lumen measurement data to the lighting system for analysis and/or computation. Similarly, the light sensor can be configured to measure color coordinates to determine a change in color or color temperature. In another aspect, a light sensor can be utilized to measure the footcandle level currently present in the room. For example, a current footcandle level of a designated area can fall to 40 footcandles and can be detected by a light sensor. The light fixture can also be configured to send a signal containing the footcandle measurement data to the lighting system for analysis and/or computation.

In block 908, a determination is made as to whether the current illumination output level associated with the light fixture falls below (or rises above) a predetermined threshold. In one aspect, control unit 102 compares the current illumination output level of the light fixture with the previously recorded illumination output level that was associated with the designated visual comfort level (e.g., compare the current illumination output level with the original output level). If control unit 102 detects that the illumination output falls below a designated threshold level, such as the previously recorded visual comfort level illumination output, then method 900 continues to block 910. Otherwise, method 900 loops back to block 906.

Returning to the aforementioned example, the lighting system can utilize the measurement data received from the light sensor and determine whether the light fixture illumination output level falls below the previously established 800 lumens associated with the visual comfort level. For example, the lighting system can compare the measured lumen level from the light sensor and determine that 785 lumens is less than the 800 lumens. In some aspects, the lighting system can be configured to implement a buffer or error factor (e.g., 5%) without departing from the scope of the present subject matter. By utilizing a buffer or error factor, the current lumen level of the lighting fixture can fall below or rise above a designated number of lumens without triggering the lighting system. In an alternate embodiment, the light system can utilize the measurement data received from the light sensor and determine whether the lighting level in the designated area falls below the previously established 45 footcandles associated with the visual comfort level. For example, the lighting system can compare the measured footcandle level detected by the light sensor and determine that 40 footcandles (e.g., current reading) is less than 45 footcandles (e.g., visual comfort level).

In block 910, the high end trim level is adjusted. In one aspect, the high end trim level is adjusted such that the current illumination output level of the light fixture is increased in an attempt to achieve the original illumination output level associated with the established visual comfort level in the defined area. Returning to the aforementioned example, the lighting system can be configured to utilize one or more light sensors to adjust the light fixture to return to produce 800 lumens (since this was the illumination output level associated with the designated visual comfort level). In an alternate embodiment, the lighting system can be configured to utilize one or more light sensors to adjust the light fixture to return to produce the necessary output to produce 45 footcandles in the designated area The lighting system would then recalculate the high end trim value by dividing the original illumination output level (800 lumens) by the degraded maximum illumination output of the LED light fixture (950 lumens). In this scenario, the high end trim level would be increased to 84%.

In block 912, a determination is made as to whether the original visual comfort level is achieved. If the high end trim level (i.e., the associated illumination output level of the light fixture) can be adjusted to achieve the visual comfort level, then method 900 continues to block 906 where the monitoring of the illumination output level of the light fixture is resumed. Otherwise, method 900 proceeds to block 914 where a system administrator is alerted. Returning to the aforementioned example, the lighting system can be configured to utilize one or more light sensors to determine if the lighting fixture is able to produce the 800 lumens or 45 footcandles associated with the designated visual comfort level. If the light fixture is incapable of producing the 800 lumens or 45 footcandles (e.g., despite the amount of power provided), then the lighting system alerts the system administrator.

In block 914, the system administrator is alerted that the high end trim level (i.e., the associated illumination output level of the light fixture) cannot be adjusted to attain the desired visual comfort level. In one embodiment, the alert can comprise an audible alarm, an email message, a text message, or the like that indicates that the light fixture has degraded to the point it can no longer be used to adequately light the defined area (per the visual comfort level).

Figure 10:
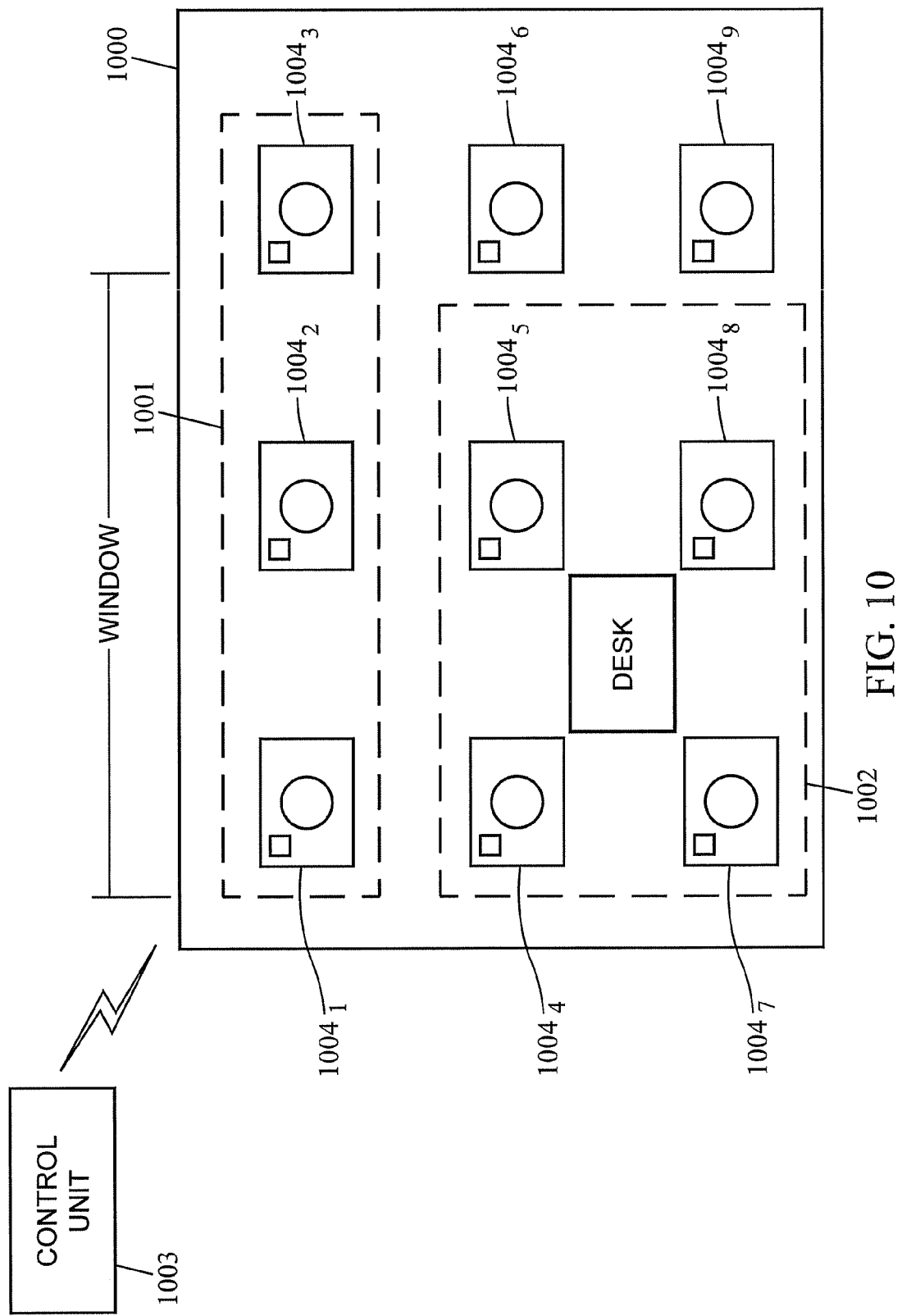
FIG. 10 is a block diagram illustrating an LED lighting control system for operating groups of light fixtures according to one aspect of the disclosure herein.

FIG. 10 is a block diagram of an LED lighting system according to one aspect of the disclosure herein. For example, FIG. 10 illustrates an LED light fixture arrangement in a defined area 1000, which can be an office or conference room, for example. Defined area 1000 can comprise a plurality of LED light fixtures 1004$_{1...9}$ that can be managed and operated by a control unit 1003 (not unlike control unit 102 in FIG. 1). Although FIG. 10 depicts control unit 1003 communicatively connected to LED light fixtures 1004$_{1...9}$ via a wireless methodology, the control unit and light fixtures can communicate via a wired connection. In one aspect, LED light fixtures 1004$_{1...9}$ can be positioned and spaced around defined area 1000. In one aspect, control unit 1003 can control each of LED light fixtures 1004$_{1...9}$ individually or by a fixture grouping. For example, LED light fixtures 1004$_{1...3}$ can be assigned to a light fixture group 1001 and LED light fixtures 1004$_4$, 1004$_5$, 1004$_7$, and 1004$_8$ can be assigned to a light fixture group 1002. Notably, control unit 1003 can receive illumination output information detected by light sensors (either stand-alone light sensors or light sensors incorporated in LED light fixtures 1004). Utilizing the received illumination output information, control unit 1003 (via software executed by a hardware processor) can determine if a visual comfort level in defined area 1000 is no longer being achieved and can accordingly adjust the high end trim level for the plurality of LED light fixtures 1004 either individually or on a group basis.

The advantages afforded by the control of groupings of LED light fixtures comprise convenience if a plurality of LED light fixtures are commonly located a window that permits daylight to enter the defined area or directly over furniture with reflective surfaces. In such a scenario, the grouping of LED light fixtures can have a low high end trim level since the ambient light attributed to the window and/or furniture would contribute toward the visual comfort level. Conversely, a grouping of LED light fixtures can be located near a light obscuring structure, such as a column or wall partition, or directly over furniture with non-reflective surfaces. In such a scenario, the grouping of LED light fixtures can have a high end trim level.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A light emitting device (LED) lighting system comprising:
    at least one LED configured to emit light at an illumination output level;
    at least one light sensor configured to measure the illumination output level of light emitted by the at least one LED and an ambient light level in proximity to the at least one LED; and
    a control unit, the control unit configured:
        to detect a light level that comprises both the illumination output level emitted by the at least one LED and the ambient light level falling below an original illumination output level in an area, wherein the original illumination output level comprises a stored numerical value that represents a portion or percentage of a maximum illumination output level of the at least one LED and is established based on a predetermined lighting level in the area; and
        to increase the illumination output level by the at least one LED to produce the predetermined lighting level associated with the original illumination output level in the area.

2. The system of claim 1 wherein the control unit is configured to determine the original illumination output level of the at least one LED that produces the predetermined lighting level in the area.

3. The system of claim 1 wherein the control unit is further configured to monitor the illumination output level on a periodic basis.

4. The system of claim 1 wherein the control unit is further configured to monitor the illumination output level on a nightly basis.

5. The system of claim 1 wherein the original illumination output level of the at least one LED is stored in a memory module at the control unit.

6. The system of claim 1 wherein the original illumination output level of the at least one LED is locally stored in an LED light fixture containing the LED.

7. The system of claim 1 wherein the control unit is configured to increase the illumination output level by the at least one LED on an individual basis.

8. The system of claim 1 wherein the control unit is configured to increase the illumination output level by the at least one LED on a group basis.

9. The system of claim 1 wherein the at least one LED is used as a light sensor in a non-light emitting state.

10. The system of claim 1 wherein the light sensor comprises a light sensor device that is separate from the at least one LED.

11. The system of claim 1 wherein the at least one light sensor is configured to measure at least one of: a brightness level and a color level.

12. The system of claim 1 wherein the control unit is configured to consider the ambient light level in the event the illumination output level by the at least one LED is increased to produce the predetermined lighting level in the area.

13. The system of claim 1 wherein the illumination output level of the light emitted by the LED includes reflected light in the area.

14. The system of claim 13 wherein the control unit detects the illumination output level emitted by the at least one LED falling below the original illumination output level using a moving average of illumination output level measurements taken by the at least one light sensor.

15. A light emitting device (LED) lighting system comprising:
    at least one LED light fixture, wherein the LED light fixture comprises an LED for generating an illumination output level;
    at least one light sensor for measuring the illumination output level emitted by the at least one LED light fixture; and
    a control unit configured to:
        determine a high end trim level of the at least one LED light fixture, wherein the high end trim level comprises a percentage of a maximum illumination output level of the at least one LED light fixture that corresponds to an original illumination output level that produces a visual comfort level in an area;
        detect the illumination output level emitted by the at least one LED light fixture falling below the original illumination output level; and
        adjust the high end trim level of the at least one LED light fixture to increase the illumination output level by the at least one LED light fixture to produce the visual comfort level in the area.

16. The system of claim 15 wherein the control unit is further configured to monitor the illumination output level on a periodic basis.

17. The system of claim 15 wherein the control unit is further configured to monitor the illumination output level on a nightly basis.

18. The system of claim 15 wherein the original illumination output level of the at least one LED light fixture is stored in a memory module at the control unit.

19. The system of claim 15 wherein the original illumination output level of the at least one LED light fixture is locally stored in the at least one LED light fixture.

20. The system of claim 15 wherein the control unit is configured to increase the illumination output level by the at least one LED light fixture on an individual basis.

21. The system of claim 15 wherein the control unit is configured to increase the illumination output level by the at least one LED light fixture on a group basis.

22. The system of claim 15 wherein the light sensor is integrated within the at least one LED light fixture.

23. The system of claim 15 wherein the light sensor is configured to measure at least one of: a brightness level and a color level.

24. The system of claim 15 wherein the at least one LED is used as a light sensor in a non-light emitting state.

25. The system of claim 15 wherein the light sensor comprises a light sensor device that is separate from the at least one LED light fixture.

26. The system of claim 15 wherein the light sensor is configured to measure ambient light that is proximate to the at least one LED light fixture.

27. The system of claim 15 wherein the control unit is configured to consider ambient light that is proximate to the at least one LED light fixture in the event the illumination output level by the at least one LED light fixture is increased to produce the visual comfort level in the area.

28. The system of claim 15 wherein the visual comfort level is established via input received from a system administrator.

29. The system of claim 15 wherein the visual comfort level is established by utilizing preloaded illumination output level data accessible by the control unit.

30. The system of claim 15 wherein the illumination output level emitted by the LED includes reflected light in the area.

31. The system of claim 30 wherein the control unit detects the illumination output level emitted by the LED falling below the original illumination output level using a moving average of illumination output level measurements taken by the at least one light sensor.

32. A method for operating at least one light emitting device (LED), comprising:
  detecting a light level that comprises both a current illumination output level in an area emitted by at least one LED and an ambient light level in proximity to the at least one LED falling below an original illumination output level, wherein the original illumination output level comprises a stored numerical value that represents a portion or percentage of a maximum illumination output level of the at least one LED and is established based on a desired lighting level; and
  adjusting the at least one LED to increase the current illumination output level in the area to produce the desired lighting level.

33. The method of claim 32 comprising establishing the desired lighting level in the area, wherein the desired lighting level is associated with the original illumination output level emitted by the at least one LED.

34. The method of claim 32 comprising determining if the current illumination output level emitted by the at least one LED falls below the original illumination output level on a periodic basis.

35. The method of claim 34 wherein the periodic basis comprises a nightly basis.

36. The method of claim 32 wherein the original illumination output level of the at least one LED is stored in a memory module at a control unit that is communicatively connected to the at least one LED.

37. The method of claim 32 wherein the original illumination output level of the at least one LED is locally stored in an LED light fixture that contains the LED.

38. The method of claim 32 wherein the illumination output level by the at least one LED is increased on an individual basis.

39. The method of claim 32 wherein the illumination output level by the at least one LED is increased on a group basis.

40. The method of claim 32 wherein detecting the current illumination output level emitted by the at least one LED comprises receiving, at a control unit communicatively connected to the at least one LED, readings associated with the current illumination output levels from at least one light sensor.

41. The method of claim 40 wherein the at least one light sensor is integrated within the at least one LED.

42. The method of claim 40 wherein the at least one light sensor comprises at least one light sensor device that is separate from the at least one LED.

43. The method of claim 32 wherein the ambient light level is considered along with the current illumination output level by the at least one LED to produce the desired lighting level in the area.

44. The method of claim 40 wherein the at least one light sensor is configured to measure at least one of: a brightness level and a color level.

45. The method of claim 32 wherein the at least one LED is used as a light sensor in a non-light emitting state.

46. The method of claim 33 wherein the desired lighting level is established via input received from a system administrator.

47. The method of claim 33 wherein the desired lighting level is established by utilizing preloaded illumination output level data accessible by a control unit.

48. The method of claim 32 wherein detecting the current illumination output level in the area includes detecting reflected light in the area.

49. The method of claim 48 wherein detecting the current illumination output level includes detecting the current illumination output level emitted by the at least one LED falling below the original illumination output level using a moving average of a plurality of illumination output level measurements taken by at least one light sensor.

50. A method for operating at least one light emitting device (LED) light fixture in a lighting system, comprising:
  establishing a visual comfort level in an area, wherein the visual comfort level is associated with an original illumination output level emitted by at least one LED light fixture;
  determining a high end trim level of the at least one LED light fixture, wherein the high end trim level is a percentage of a maximum illumination output level of the at least one LED light fixture and corresponds to the original illumination output level that produces the visual comfort level in the area;

detecting a current illumination output level emitted by the at least one LED light fixture falling below the original illumination output level; and adjusting the high end trim level of the at least one LED light fixture to increase the current illumination output level by the at least one LED light fixture to produce the visual comfort level in the area.

51. The method of claim 50 comprising determining if the current illumination output level emitted by the at least one LED light fixture falls below the original illumination output level on a periodic basis.

52. The method of claim 50 wherein the periodic basis comprises a nightly basis.

53. The method of claim 50 wherein the original illumination output level of the at least one LED light fixture is stored in a memory module at a control unit that is communicatively connected to the at least one LED light fixture.

54. The method of claim 50 wherein the original illumination output level of the at least one LED light fixture is locally stored in the at least one LED light fixture.

55. The method of claim 50 wherein the illumination output level by the at least one LED light fixture is increased on an individual basis.

56. The method of claim 50 wherein the illumination output level by the at least one LED light fixture is increased on a group basis.

57. The method of claim 50 wherein detecting the current illumination output level emitted by the at least one LED light fixture comprises receiving, at a control unit communicatively connected to the at least one LED light fixture, readings associated with the current illumination output levels from at least one light sensor.

58. The method of claim 57 wherein the at least one light sensor is integrated within the at least one LED light fixture.

59. The method of claim 57 wherein the at least one light sensor comprises at least one light sensor device that is separate from the at least one LED light fixture.

60. The method of claim 57 wherein the at least one light sensor is configured to measure ambient light that is proximate to the at least one LED light fixture.

61. The method of claim 57 wherein the at least one light sensor is configured to measure at least one of: a brightness level and a color level.

62. The method of claim 50 wherein the at least one LED light fixture is used as a light sensor in a non-light emitting state.

63. The method of claim 50 wherein the ambient light that is proximate to the at least one LED light fixture is considered along with the current illumination output level by the at least one LED light fixture to produce the visual comfort level in the area.

64. The method of claim 50 wherein the visual comfort level is established via input received from a system administrator.

65. The method of claim 50 wherein the visual comfort level is established by utilizing preloaded illumination output level data accessible by a control unit.

66. The method of claim 50 wherein the current illumination output level emitted by the LED light fixture includes reflected light in the area.

67. The method of claim 66 wherein detecting the current illumination output level includes detecting the current illumination output level emitted by the at least one LED light fixture falling below the original illumination output level using a moving average of illumination output level measurements taken by at least one light sensor in the area.

68. A method for monitoring light, comprising:

determining an original illumination output level in an area emitted by at least one light and an ambient light level in proximity to the at least one light;

detecting a light level that comprises both a current illumination output level in the area resulting from the at least one light and the ambient light level falling below the original illumination output level, wherein the original illumination output level comprises a stored numerical value that represents a portion or percentage of a maximum illumination output level of the at least one light and is established based on a predetermined lighting level in the area; and adjusting the at least one light to increase the current illumination output level to produce the predetermined lighting level in the area.

* * * * *